United States Patent [19]

Yoshino et al.

[11] 3,951,757

[45] Apr. 20, 1976

[54] PROCESS OF MAKING ELECTRORECORDING SHEET

[75] Inventors: Kimiaki Yoshino, Moriguchi; Wataru Shimotsuma, Hirakata; Kin-ichi Adachi, Takarazuka; Yoichi Sekine, Katano; Fujio Oda, Ashiya, all of Japan

[73] Assignee: Matsushita Electric Industrial Co., Ltd., Osaka, Japan

[22] Filed: Aug. 5, 1974

[21] Appl. No.: 494,886

[30] Foreign Application Priority Data

Aug. 17, 1973 Japan .............................. 48-92600

[52] U.S. Cl. .................................. 204/2; 346/76 R; 346/135; 427/152

[51] Int. Cl.[2] .................... B21H 1/20; G01D 15/10; G02B 27/22

[58] Field of Search ............ 346/74 CH, 74 E, 76 R, 346/135; 204/2, 18 PC; 340/173 CH; 117/1.7, 36.7, 36.9; 427/152, 145

[56] References Cited

UNITED STATES PATENTS

| | | | |
|---|---|---|---|
| 3,518,038 | 6/1970 | Spatz | 204/2 |
| 3,642,475 | 2/1972 | Vrancken | 346/135 |
| 3,655,527 | 4/1972 | Curran | 204/2 |
| 3,789,425 | 1/1974 | Matsushima | 346/135 |
| 3,792,481 | 2/1974 | Nagashima | 346/135 |

*Primary Examiner*—T. M. Tufariello
*Attorney, Agent, or Firm*—Stevens, Davis, Miller & Mosher

[57] ABSTRACT

Improvement in a method for producing electrorecording paper consisting of an electroconductive material of cuprous iodide, a heat sensitive color forming material and a support and forming color in response to an electric signal when current is caused to flow, which comprises adding a reducing agent to a suspension of cuprous iodide to increase resistance of cuprous iodide and to whiten the ground color.

17 Claims, 3 Drawing Figures

PROCESS OF MAKING ELECTRORECORDING SHEET

This invention relates to a method for producing an electrorecording sheet capable of converting an electric signal directly to a visible image.

Processes for converting electric signals directly to visible images have proliferated in recent years and those which are practiced at present are ink recording, photochemical recording, electrolytic recording, thermal recording, sparking recording, etc. However, these processes respectively have their merits and demerits.

For example, the sparking recording paper comprises a support paper, an electroconductive carbon layer provided on said support paper and a white masking layer provided on said carbon layer. A recording needle is allowed to contact the surface of the recording paper and electric energy is applied to the recording needle and the electroconductive layer to remove the white masking to form a visible image. This recording paper is a completely dry system and can easily be handled and furthermore requires no treatments such as development and fixation, whereby recording can be carried out at high speed. However, an offensive smell, smoke and sludge are generated at recording, abrasion of the recording needle is great and the color of the surface is greyish white and lacks a natural property.

The electrolytic recording paper comprises a base paper impregnated with an electrolyte and a color former, which color former combines with a metal ion from the recording needle to form color Recording is accomplished in the wet state by flowing current. For example, the electrolytic recording paper uses ammonium nitrate the electrolyte, sodium diethylthiocarbazide as the color former and iron as the recording needle, or uses sodium chloride as the electrolyte and tellurium as the recording needle without a color former. In both cases, a positive potential is applied to the recording needle, which is allowed to contact with the recording paper, and negative potential is applied to a counter electrode, the metal of the recording needle is ionized and the ions diffuse into the recording paper. These ions combine with the color former to form color in the former case. In the latter case, the ions are oxidized with oxygen in the air to become metal to form a visible image. With this recording paper, a visible image can directly be obtained by the current flow. Therefore, this recording paper has been widely used in information recording devices and has the characteristics that recording of high density can be obtained and selection of color tone is possible. However, it has the disadvantages that handling is troublesome because the process is of the wet type and also because the associated apparatus is apt to be corroded.

The inventors have proposed an electrorecording sheet which has characteristics equal to those of the above mentioned recording paper and which overcomes the defects thereof. This electrorecording sheet comprises a heat sensitive layer containing a substance which forms or changes color by electrochemical reaction or heat energy which occurs in response to an electric signal and an electroconductive layer comprising cuprous iodide on which said heat sensitive layer is provided. Current is caused to flow through a recording needle electrode which contacts with the recording sheet and a counter electrode to generate heat energy near the recording needle electrode, which causes formation of a colored visible image in the heat sensitive layer.

This recording sheet is superior to the sparking recording paper in that the former produces an image of higher gradation and contrast and generates no smell also it forms no recording dregs and does not stain the equipment.

Furthermore, since the sparking recording paper uses carbon in the electroconductive layer, it is not possible to make a copy with transmitting light. In addition, the color forming mechanism of the sparking recording paper is that of scattering away the masking layer by discharging to make the under colored layer visible. Therefore, a large amount of pigment is required for masking the color of the carbon electroconductive layer and the resistance of the recording paper inevitably increases to cause generation of an offensive smell and recording dregs due to discharge at recording.

On the other hand, since the electrorecording sheet requires no such colored layer and masking layer, substantially no offensive smell, recording dregs, sparks, smoke, etc. are generated. Moreover, since cuprous iodide has a white or light yellow color, copying can be carried out with the use of transmitting light. In addition, the appearance of the electrorecording sheet is nearly the same as that of ordinary paper. Furthermore, cuprous iodide is hardly influenced by atmospheric temperature and humidity and so it does not require any such preservation vessel as is required in the case of the wet electrolytic recording paper and recording of a constant quality can always be obtained. In general, in the case of the electrorecording sheet, when the surface resistivity thereof is several KΩ, sufficiently excellent recording can be obtained under the conditions of a recording voltage of 200 – 300 V and a recording speed of 3.5 m/sec.

The present invention which is an improvement of a method for producing the electrorecording sheet having the characteristics as mentioned above is characterized in that together with cuprous iodide which imparts electroconductivity to a recording sheet a reducing agent is added for decreasing free iodine, increasing resistance and whitening the recording sheet.

It has been known that in an ion crystal having composition which deviates from a stoichiometric one, a p-type semiconductivity is observed when metal ions are short (or anions are excessive). As an example, it has been known that the conductivity of $Cu_2O$ has close connection with the oxygen content and the oxygen conductivity increases as the content becomes excessive. Chemical analysis shows that in cuprous iodide CuI the content of iodine I is excessive compared to exact stoichiometric ratio derived from the molecular formula; that is, one iodine atom to one copper atom. According to the investigation by Negel et al, there exists a close connection between the conductivity of CuI and the iodine pressure and the conductivity increases with the iodine pressure. It is considered that this is because iodine is adsorbed in cuprous iodide to produce vacant lattice point of $Cu^+$ serving as a p-type semiconductor, which in turn increases the conductivity. Therefore, the resistance value of cuprous iodide is influenced by the amount of free iodine.

When cuprous iodide containing free iodine in a large amount is suspended in a binder and the suspension is coated on a support to form an electroconductive layer, the surface resistivity of the layer is less than 1 KΩ. When an electrorecording sheet is produced using said electroconductive layer, the surface resistivity is too low and a large quantity of current flows under a recording voltage of 200 – 300 V and a recording speed of 3.5 m/sec resulting in burning of the color forming layer, generation of smoke and dregs and reduction in recording density. Furthermore, cuprous iodide containing free iodine in a large amount has a reddish color and causes reduction in the quality of the images obtained.

By adding a reducing agent to the suspension of cuprous iodide, the amount of free iodine is decreased to increase the resistance of the cuprous iodide thereby obtaining a surface resistivity (several KΩ) suitable as an electroconductive layer of a recording sheet and furthermore to remove the reddish color and whiten the sheet thereby obtaining a recording sheet having the same appearance as ordinary paper.

Many materials have been tested on their suitability as the reducing agent and it has been found that those which are enumerated hereinafter are effective. Especially sodium sulfite has a conspicuous effect. When a mixture comprising 100 parts by weight of cuprous iodide and 0.2 – 2 parts by weight of sodium sulfite is used as an electroconductive layer of an electrorecording sheet, surface resistivity of the layer is several KΩ and sufficient recording is obtained with a recording voltage of 200 – 300 V and a recording speed of 3.5 m/sec. A recording sheet produced with the addition of a reducing agent to cuprous iodide shows a change of about 20% in surface resistivity after a lapse of 120 hours by irradiation with a fluorescent lamp of 5600 Lux at an atmosphere of 20° C and 40% RH. Thus, this recording sheet is suitable for practical use.

Other reducing agents are effective for increasing the resistance of cuprous iodide, but recording sheets produced with them are somewhat unstable in maintanence of surface resistivity while there are no troubles in recording at room temperature.

The basic construction of the recording sheet of the present invention and a method of recording with this recording sheet will be explained below with reference to the accompanying drawings.

Figure 1:
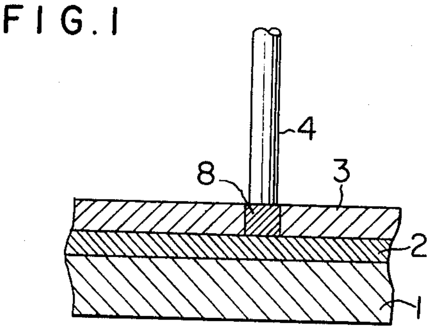
FIG. 1 is a drawing showing the fundamental structure of the recording sheet according to the present invention.

In these drawings, 1 is a support which may be made of paper, cloth, glass, plastic film, carbonimpregnated paper, metal-deposited paper, carboncoated paper, etc., 2 is an electroconductive layer comprising cuprous iodide to which a reducing agent is added, 3 is a heat sensitive layer which contains a component capable of forming a color due to the heat energy generated in response to an electric signal and which may also contain cuprous iodide and the reducing agent, 4 is a recording needle electrode, and 5 is a face electrode which is a counter electrode for said electrode 4. When a switch 6 is closed, an electric current flows between the two electrodes through the heat sensitive layer 3 and the electroconductive layer 2 from an alternating or direct current source 7, whereby a colored record 8 is obtained in the electrorecording layer 2 near the recording needle electrode 4.

Figure 2:
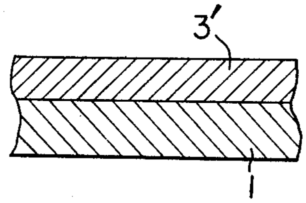
FIG. 2 is a drawing showing one modification of the recording sheet shown in FIG. 1.
Figure 3:
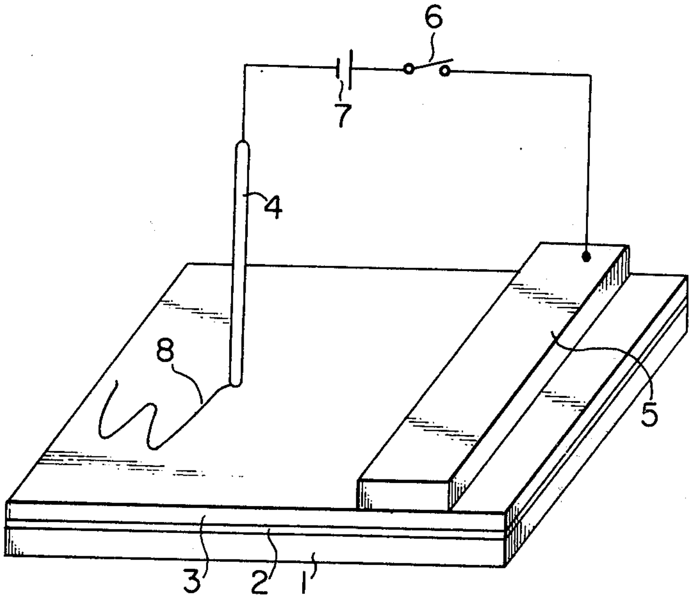
FIG. 3 is a drawing showing the manner of recording an image on the recording sheet.

FIG. 2 shows another structure of the recording sheet wherein the electroconductive layer 2 is omitted and heat sensitive layer 3' is directly formed on the support 1. In this case, cuprous iodide together with a reducing agent for iodine are added to the heat sensitive layer 3' to impart electroconductivity to the layer 3'.

Although not shown in the drawing, the order of layer 2 and layer 3 in FIG. 1 may be reversed. In this case, preferably electroconductivity is imparted to the heat sensitive layer 3 as in the case of the layer 3'.

Materials suitable for use in the present invention are given below:

(1) Heat sensitive color forming chemicals.

Those which form color in response to heat energy upon flowing current. They include (a) combination of color forming dye such as crystal violet lactone and color forming agent of phenolic acidic material such as bisphenol A, (b) organic spot reagent and organic metal, and (c) redox indicator. These materials are dispersed in binder material to form color forming component.

(a-1) Color-forming dye:

Generally, the color-forming dye used in a leuco body of triphenylmethane type dye represented by the below-mentioned general formula (I) or a leuco body of fluoran type dye represented by the belowmentioned general formula (II).

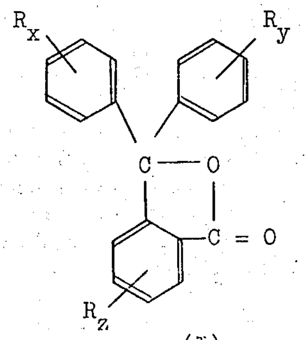

(I)

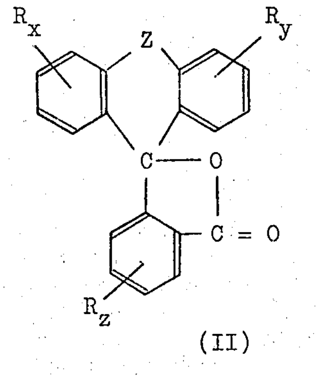

(II)

wherein $R_x$, $R_y$ and $R_z$ are individually a hydrogen or halogen atom, or a hydroxyl, alkyl, nitro, amino, dialkylamino, monoalkylamino, acetamino, alkoxy, cyanoalkoxy, or aryl group; and Z is an atom necessary to form a heterocyclic ring, and is O or S.

Concrete examples of the above-mentioned compounds are as shown below.

Compounds of the formula (I):

3,3-Bis(p-dimethylaminophenyl)-phthalide 3,3-Bis(p-dimethylaminophenyl)-6-dimethylaminophthalide (Crystal Violet Lactone)

3,3-Bis(p-dimethylaminophenyl)-6-aminophthalide
3,3-Bis(p-dimethylaminophenyl)-6-nitrophthalide
3,3-Bis(p-dibutylaminophenyl)-phthalide
3,3-Bis(p-dimethylaminophenyl)-4,5,6,7-tetrachlorophthalide Compounds of the formula (II):
3-Dimethylamino-6-methoxyfluoran
7-Acetamino-3-dimethylaminofluoran
3-Dimethylamino-5,7-dimethylfluoran
3-Diethylamino-5,7-dimethylfluoran
3,6-Bis-β-methoxyethoxyfluoran
3,6-Bis-β-cyanoethoxyfluoran Other lactam compounds:
9-p-Nitroanilino-3,6-bis(diethylamino)-9-xanthenyl-o-benzoic acid lactam (Rhodamin B lactam)
9-p-Nitroanilino-3,6-bis(dimethylamino)-9-thio-xanthenyl-o-benzoic acid lactam The above-mentioned dye bases are effectively used. They are scarcely soluble in water, and can be pulverized to fine particles of less than 10 microns in size.

(a-2) Color-forming agent: Preferable as the color-forming agent capable of forming a dye by chemical reaction with the color-forming dye mentioned in the preceding item (a-1) is a phenolic compound or an organic acid. It is desirable that the said compound or acid is solid at room temperature and can liquefy or vaporize at above 70° C.

(i) Examples of the phenolic compound are as follows; 3,5-Xylenol, thymol, 4-tert-butylphenol, 4-hydroxyphenoxide, methyl-4-hydroxybenzoate, 4-hydroxyacetophenone, α-naphthol, β-naphthol, catechol, hydroquinone, resorcinol, 4-tert-octylcatechol, 4,4′-sec-butylidenediphenol, 2,2′-dihydroxydiphenyl, 2,2′-methylenebis(4-methyl-6-tert-butylphenol), 2,2′-bis(4-hydroxyphenyl)-propane, 4,4′-isopropylidenebis(2-tert-butylphenol), 4,4′-sec-butylidenediphenol, pyrogallol and 4,4′-isopropylidenediphenol.

(ii) Examples of the organic acid are as follows: Stearic, gallic, benzoic, salicylic, succinic, 1-hydroxy-2-naphthoic, 2-hydroxy-p-toluic, o-hydroxybenzoic, m-hydroxybenzoic, p-hydroxybenzoic and 4-hydroxyphthalic acids.

(b) Organic spot reagent and organic metal salt: The organic spot reagent referred to herein is a compound capable of being colored or discolored by reaction with metal ions. At present, a large number of such compounds are known. In the present invention, however, there is utilized the phenomenon that at least one of the organic spot reagent and the metal used in combination therewith is melted due to the heat energy generated at the time of application of electric current and the two react with each other to form a color. It is therefore desirable that one of the two which is lower in melting point is solid at below 70° C. and has a melting point of 150° C. or less. In this respect, metallic soap is most preferable as the organic metal salt. Combinations of the organic spot reagent and the metal are as follows:

(i) Organic spot reagent: Metal:

| | |
|---|---|
| Diphenylthiocarbazide: | Cu, Fe, Mg or Hg |
| Dimethylglyoxime: | Cu, Fe or Ni |
| Benzoinoxime: | Cu |
| 8-Hydroxyquinoline: | Cd, Cu, Fe, Pb, Mn, Ni or Zn |
| Dinitrophenylcarbazide: | Cd |
| Rhodanine: | Cu or Hg |

-continued

| | |
|---|---|
| Diphenylthiocarbazone: | Cu, Ba, Co, Fe, Pb, Hg or Zn |
| Diphenylcarbazone: | Co, Cu, Pb, Mg, Mn, Hg, Ni or Zn |
| Dithiooxamine: | Co, Cu, Pb or Ni |
| 2-Mercapto-4-phenylthiazole: | Co or Pb |
| 3,5-Dimethylpyrazole: | Co |
| α-Naphthylamino-dithio-carbamic acid: | Co or Fe |
| Benzidine: | Cu, Pb or Mn |
| p-Dimethylaminobenzylidene rhodanine: | Cu, Fe, Mg or Hg |
| Salicylaldoxime: | Cu or Pb |
| Triphenyl thiophosphate: | Ni |
| p,p′-Tetramethyl-diamino-diphenylmethane: | Pb or Mn |
| Anthranilic acid: | Zn |
| Diphenylbenzine: | Zn |
| Catechol: | Fe |
| Gallic acid: | Fe |
| Dihydroxynaphthalene: | Fe |
| Alizarine: | Cu |
| Quinalizarin: | Cu |

(ii) Organic metal salt: As the organic metal salt, a metallic soap having the aforesaid metal ions is effective. Typical examples of the combinations of organic spot reagents with organic metal salts, and color tones of colors developed by use of said combinations, are shown below.

| Organic spot reagent: | Organic metal salt (Color tone of developed color) |
|---|---|
| Dimethylglyoxime: | Nickel stearate (Pink) |
| Benzoinoxime: | Copper myristate (Yellowish green) |
| Dithiooxamide: | Nickel stearate (Purple) |
| 8-Hydroxyquinoline: | Iron oleate (Black) |
| Gallic acid: | Ferric stearate (Black) |
| Alizarin: | Copper oleate (Purplish red) |
| Quinalizarin: | Copper oleate (Purplish red) |
| Diphenylcarbazone: | Copper stearate (Red) |
| Diphenylcarbazone: | Cadmium stearate (Red) |
| Diphenylcarbazone: | Copper myristate (Purple) |
| Diphenylcarbazone: | Zinc palmitate (Deep red) |
| Diphenylthiocarbazide: | Mercuric stearate (Purple) |
| Diphenylthiocarbazide: | Lead myristate (Deep red) |

(c) It has been found that a substance, which has heretofore been known as redox indicator, forms a color in the vicinity of the recording needle at the time of application of an electric current, and it has been confirmed that said substance is effective as a color-forming material for use in electrorecording paper. The redox indicator referred to herein is a substance which is colored or discolored due to oxidation with the heat generated at the time of application of the electric current, and a leuco body is preferable in view of the whiteness of the background. Examples of the redox indicators used in the present invention, and color tones of colors developed by said indicators, are shown below.

Leucoethyl Nile Blue (Blue)
Leucomethyl Capryl Blue (Blue)
Leucotoluidine Blue (Purple)
Leucodiphenylamine (Purple)
Leuco-N-methyldiphenylamine-p-sulfonic acid (Reddish purple)
leucophenylanthranilic acid (Reddish purple)
Triphenyltetrazolium chloride (Red)

Methylviologen (Purple)
Leucosafranine T (Red)
Leucoindigosulfonic acid (Blue)
Leucophenosafranine (Red)
Leucomethylene Blue (Blue)
Leucodiphenylbenzodine (Purple)
Leucoerioglucine A (Yellowish green to Red)
Leuco-p-nitrodiphenylamine (Purple)
Leuco-malachite Green (Green)

(2) Binder: In order to disperse in the state of fine particles the color forming dye, color-forming agent, organic spot reagent and organic metal salt used in the color-developing layer, and/or cuprous iodide and reducing agent, and to impart bonding ability thereto, there is used a binder. Since most of the abovementioned color-forming dye, color-forming agent, organic spot reagent and cuprous iodide are water-insoluble, the use of a water-soluble binder is effective. Further, the water-soluble substance has such characteristic that it is easily handled and treated at the time or production of the recording paper.

(i) Water-soluble binder: Examples of the water-soluble binder include hydroxyethyl cellulose, carboxymethyl cellulose, methoxy cellulose, polyvinyl alcohol, polyvinyl pyrrolidone, polyacrylamide, polyacrylic acid, gelatin, starch, and gum arabic.

(ii) Water-insoluble binder: As the binder, an organic solvent-soluble binder may also be used. In case a binary system comprising for example, a color-forming dye and a color-forming agent, is used as the thermorecording material of the color-developing layer, the two components should individually be dispersed in the form of fine particles into the binder. If either one of the two components is dissolved in a solvent used to dissolve the binder, a color formation reaction to deprive its function as a recording medium takes place at the time of mixing of the two. Accordingly, solvents for the binder mentioned herein are necessarily limited depending on the kind of color-forming components.

Concrete examples of the water-insoluble binder are natural rubber, synthetic rubbers, chlorinated rubbers, alkyd resins, styrene-butadiene copolymers, polybutyl methacrylate, low molecular weight ethylene polymers, low molecular weight styrene polymers, polyvinyl butyral, phenolic resins and nitrocellulose.

(3) Reducing agent: Examples of the reducing agents added for reducing free iodine in cuprous iodide or reducing $CuI_2$ contained in a slight amount in cuprous iodide to CuI and simultaneously reducing free iodine are as follows:

(a) Sulfur compounds such as sodium sulfide, sodium polysulfide, ammonium sulfide, etc.

(b) Sulfites such as sodium sulfite, potassium sulfite, etc.

(c) Organic reducing agents such as aldehydes, formic acid, oxalic acid, etc.

Amounts of each component used may vary greatly depending upon quality of CuI and kind of binder used, but generally are as follows:

(1) In case of two layer construction:

| | | |
|---|---|---|
| Electroconductive layer | CuI | 100 parts by weight |
| | Binder | 1–50 parts by weight |
| | Reducing agent | 0.01–20 parts by weight |

-continued

| | | |
|---|---|---|
| Color forming layer | Color forming component | 100 parts by weight |
| | CuI | 0–300 parts by weight |
| | Binder | 1–50 parts by weight |
| | Reducing agent | 0–20 parts by weight |

(2) In case of one layer construction:

| | |
|---|---|
| CuI | 100 parts by weight |
| Color forming component | 5–200 parts by weight |
| Binder | 1–50 parts by weight |
| Reducing agent | 0.01–20 parts by weight |

The optimum amount of the reducing agent is 0.2 – 5 parts by weight per 1000 parts by weight of CuI.

The present invention will be illustrated in the following Examples, wherein polyvinyl alcohol used is PVA 205 manufactured by KURARE Co., Ltd., cuprous iodide is manufactured by KANTO CHEMICAL Co., Ltd. and emulsion of polyacrylic acid ester is Mowinyl 700 manufactured by Hoechst Co., Ltd.

EXAMPLE 1

200 parts by weight of cuprous iodide was mixed with 200 parts by weight of an aqueous solution containing 1% by weight of polyvinyl alcohol and dispersed by an attritor at room temperature. To the resultant suspension was added 5 parts by weight of an aqueous solution containing 10% by weight of $Na_2SO_3$. Furthermore, 8 parts by weight of emulsion of polyacrylic acid ester and 20 parts by weight of titanium oxide (manufactured by OSAKA TITAN Co., Ltd) were added and they were dispersed for 2 hours to obtain a dispersion (liquid A). This liquid A was coated on an art paper by use of a wire bar, which had been so adjusted as to form a film having a thickness of 8 microns and was then dried. The thus obtained coated paper had a surface resistivity of $2.8 \times 10^3$ Ω. When the reducing agent $Na_2SO_3$ was omitted from said liquid A, the surface resistivity was 800 Ω. Thus, by use of the reducing agent, a resistance necessary for electroconductive layer of electrorecording paper was obtained.

Next, 35 parts by weight of 3,3-bis(P-dimethylaminophenyl)-6-dimethylaminophthalide as a color forming dye was mixed with 200 parts by weight of an aqueous solution containing 1% by weight of polyvinyl alcohol and ground and mixed in a ball mill for 24 hours to obtain a dispersion (liquid B). Separately, 35 parts by weight of 4,4'-isopropylidenediphenol as a color former was added to 200 parts by weight of a 1% (by weight) aqueous solution of polyvinyl alcohol and ground and mixed in a ball mill for 24 hours to obtain a dispersion (liquid C).

15 Parts by weight of the liquid A, 4 parts by weight of the liquid B and 50 parts by weight of the liquid C were mixed with agitation by a mixer. The thus obtained mixed liquid was called liquid D.

Said liquid D was coated on the art paper coated with liquid A as mentioned herein above with a wire bar which was adjusted to form a coating film of about 5 microns and the film was dried to obtain an electrorecording sheet. The surface resistivity of this electrorecording sheet was 4 KΩ was a clear blue record having a reflection density of 0.91 was obtained under a recording voltage of 350 V. Ground density (Degree of whiteness of the recording sheet before recording which was measured in the same manner as measurement of density of record hereinafter explained) of said recording sheet was 0.10 which meant that the surface of the recording sheet before recording was nearly white. The recording sheet produced with cuprous iodide omitting the reducing agent had a surface resistivity of 800 Ω and formed only such an image as having a reflection density of about 0.3 under a recording voltage of 200 – 600 V. Moreover, ground density was 0.25 which meant that the surface of the recording sheet was reddish and appeared unclean.

EXAMPLE 2

To a suspension formed by dispersing 100 parts by weight of cuprous iodide and 4 parts by weight of an emulsion of polyacrylic acid ester in 100 parts by weight of 2% (by weight) aqueous solution of hydroxyethyl cellulose (manufactured by Union Carbide Corporation) was added 2 parts by weight of 5% aqueous solution of sodium thiosulfate as a reducing agent and these were agitated for 2 hours with an attritor to obtain a dispersion (liquid E).

Next, 30 parts by weight of ferric stearate was mixed with 100 parts by weight of 2% (by weight) aqueous solution of hydroxyethyl cellulose in a ball mill for 48 hours to obtain liquid F. Furthermore, 30 parts by weight of gallic acid was mixed with 100 parts by weight of 2% (by weight) aqueous solution of hydroxyethyl cellulose in a ball mill for 48 hours to obtain liquid G. 50 Parts by weight of liquid F and liquid G, respectively and 30 parts by weight of liquid E were agitated with a mixer to obtain liquid H.

The liquid E was coated on an art paper in a thickness of 10 microns with a wire bar and furthermore the liquid H was coated thereon in a thickness of 4 microns to obtain an electrorecording sheet. The thus obtained recording sheet had a ground density of 0.12, was light yellow and had a surface resistivity of 5.1 KΩ. A clear black record having a reflective density of 0.86 was obtained under a recording voltage of 350 V.

EXAMPLE 3

30 Parts by weight of liquid A, 1 part by weight of liquid B and 15 parts by weight of liquid C which were used in Example 1 were mixed by a mixer. The resultant mixture was coated on a plastic film by use of a wire bar so that the coating amount was 20 g/m² and was dried. The surface resistivity of thus coated sheet was 4.5 × 10³ Ω and a clear blue record having a reflection density of 0.81 was obtained under a recording voltage of 400 V. Ground density of this recording sheet was 0.15 which meant that the surface of the sheet before recording was nearly white. When no reducing agent was used, the surface resistivity was 1.2 × 10³ Ω and only such image as having a reflection density of about 0.4 – 0.5 was obtained under a recording voltage of 200 – 600 V. Furthermore, the ground density was 0.28, namely, the surface of the sheet before recording was reddish and appeared unclean.

EXAMPLE 4

The liquid E used in Example 2 was coated in a thickness of 10 microns on an art paper by a wire bar. Furthermore, 100 parts by weight of aqueous solution containing 2% by weight of hydroxyethyl cellulose (produce by Union Carbide Corporation) and 100 parts by weight of cuprous iodide were agitated by an attritor for 2 hours to obtain a dispersion (liquid I). 15 parts by weight of liquid I, 1 part of liquid B and 15 parts by weight of liquid C were mixed by a mixer. The mixture was coated in a thickness of 15 microns on the layer of liquid E coated as mentioned above to obtain a recording paper. Ground density of this recording paper was 0.11 which meant that surface of the recording paper before recording was nearly white. Surface resistivity of this recording paper was 3.6 × 10³ Ω and a clear blue record having a reflection density of 0.98 was obtained under a recording voltage of 350 V.

EXAMPLE 5

300 g of cuprous iodide, 200 cc of an aqueous solution containing 2% by weight of carboxymethyl cellulose (CMC-1120 produced by DAICELL K. K.), 40 cc of an aqueous solution containing 10% by weight of etherified starch (Piostarch-FM produced by NICHIDEN KAGAKU K. K.) and 0.4 g of sodium sulfite were agitated and mixed for 2 hours by an attritor. The resultant mixture was coated on an art paper by a wire bar so that coating amount was 15 g/m² to obtain an electroconductive layer. Then, 100 g of bisphenol A was dispersed in 700 g of an aqueous solution containing 10% by weight of the etherified starch to obtain liquid J. Furthermore, 40 g of N-phenyl Rhodamine lactam was dispersed in 50 g of an aqueous solution containing 5% by weight of hydroxyethyl cellulose to obtain liquid K. 50 parts by weight of liquid J and 10 parts by weight of liquid K were mixed and the mixture was coated in an amount of 3 g/m² on said electroconductive layer to form a color forming layer. Surface resistivity of the thus obtained recording paper was 6 × 10³ Ω. Ground density was 0.12 which meant that the surface of the recording paper before recording was nearly white. A clear red record having a reflection density of 0.86 was obtained under a recording voltage of 350 V. When no reducing agent was added to the electroconductive layer, surface resistivity of the recording paper was 1.8 × 10³ Ω and only such image as having a reflection density of about 0.6 at maximum was obtained under a recording voltage of 200 – 600 V. Ground density was 0.21, namely, the surface of the sheet before recording was reddish and appeared unclean.

EXAMPLES 6 – 9

Table 1 shows various combinations of color forming materials, reducing agents and binders. Amount of each material and coating method were the same as in Examples 1 and 2.

Table 1

| Example No. | Construction | Reducing agent | Color forming material | Binder |
|---|---|---|---|---|
| 6 | Same as Example 1 | Sodium polysulfide | Ferric stearate and gellic acid | Hydroxyethyl cellulose |
| 7 | '' | Benzyl aldehyde | Diphenylthiocarbazide | Gelatin |
| 8 | '' | Sodium sulfite | Leucomethylene Blue | Corn starch |
| 9 | '' | Ammonium sulfide | Leuco-malachite Green | Polyvinyl alcohol |

Recording was carried out with each recording sheet of said Examples under the following conditions: recording speed . . . 0.87 m/sec., line density . . . 4 line/mm, recording needle (tungsten) . . . 0.25 mmφ, needle pressure . . . 10 g, alternating current recording voltage . . . . 500 V (18 KHz). Density of the formed record was measured and the results are shown in Table 2. The density was measured with Macheth Reflection Densitometer RD 514, premising that when reflectance is 100%, the density is 0 and when reflectance is 10% the density is 1. Abrasion amount of the recording needle is expressed by the abrasion length of the recording needle after recording of 50 $m^2$. The recording dregs are expressed by the weight of dregs which adhered to apparatus after recording of 50 $m^2$. The line density means the number of lines (per 1 mm) recorded by the recording needle.

Table 2

| Example No. | Ground density | Maximum recording density | Abrasion amount of recording needle (mm) | Recording dregs (mg) |
|---|---|---|---|---|
| 1 | 0.10 | 1.09 | 1.1 | 240 |
| 2 | 0.12 | 0.93 | 1.2 | 350 |
| 3 | 0.15 | 1.20 | 0.9 | 400 |
| 4 | 0.11 | 0.88 | 1.2 | 280 |
| 5 | 0.12 | 0.98 | 1.3 | 260 |
| 6 | 0.09 | 1.13 | 1.0 | 420 |
| 7 | 0.13 | 1.10 | 1.2 | 350 |
| 8 | 0.14 | 0.99 | 1.1 | 290 |
| 9 | 0.13 | 0.89 | 1.0 | 320 |

As is clear from these results, the characteristics of the recording sheets according to the method of the present invention are nearly constant even when each material is changed. For example, with reference to the reducing agent, even when the kind thereof is changed, the ground density is nearly constant and within the range of 0.09 – 0.15. This reducing agent is used for removing excess iodine from cuprous iodide and any materials having said action may be used.

Moreover, the color forming materials may be any of those which can form a color or change color upon heating in view of the fundamental theory of electrorecording sheets.

The binders are used for allowing each component to adhere to a base paper and so have substantially no effect on the characteristics of the electrorecording sheet. Therefore, water insoluble binder may also be used. However, organic solvents which dissolve the color forming material cannot be used.

In the preparation of the coating liquid, agitating time and water content at the time of agitation have no effect on the quality of the coated-recording sheet.

Recording with the recording sheet can be carried out under a recording voltage of 200 – 600 V and the effects of the present invention are not influenced by recording voltage and recording speed.

Table 3 shows comparisons of the results of the recording with the present recording sheet with those of the conventional sparking recording and electrolytic recording. In this Table, abrasion amount of recording needle and recording dregs are shown in the same manner as in Table 2.

Table 3

| Type | The present invention Dry type | Sparking recording Dry type | Electrolytic recording Wet type |
|---|---|---|---|
| Corrosion of apparatus | Did not occur | Did not occur | Occured |
| Ground density | 0.09–0.15 | 0.1–0.2 | 0.1–0.2 |
| Maximum recording density | 0.9–1.2 | 1.0–1.2 | 0.7–0.8 |
| Gradation | 5–8 stages | 5–8 stages | 7–9 stages |
| Abrasion amount of recording needle (mm) | 0.9–1.3 | 4–6 | 10–20 |
| Recording dregs (g) | 0.24–0.42 | 1.0–3.5 | Unknown |
| Generation of gas | Slight amount | Considerable amount | Considerable amount |
| Offensive smell | Slight | Strong | Weak |

As is clear from the above Table, ground density and maximum recording density and gradation of the record obtained by the present invention which indicate quality of the record are the same as or superior to those of the records obtained by the conventional sparking recording and electrolytic recording. On the other hand, the record obtained by the present invention was much superior to the record obtained by the conventioned recording methods in abrasion of recording needle, recording dregs, generation of gas and smell.

What is claimed is:

1. In a process for producing an electrorecording sheet comprising heat sensitive materials capable of forming color or changing its color upon application of a heat energy, cuprous iodide which imparts electroconductivity, a binder therefor and a support and forming a visible image by color formation or color changing in the portions of the heat sensitive materials to which current is selectively applied, with heat generated by application of current, the improvement which comprises coating on the support a suspension of said cuprous iodide to which a reducing agent is added to remove free iodine to increase resistance and to whiten the sheet.

2. A process for producing an electrorecording sheet according to claim 1, wherein the binder is a water soluble binder.

3. A process for producing an electrorecording sheet according to claim 1, wherein the binder is a water insoluble binder.

4. A process for producing an electrorecording sheet according to claim 1, wherein the reducing agent is a sulfite.

5. A process for producing an electrorecording sheet according to claim 4, wherein the reducing agent is sodium sulfite.

6. A process for producing an electrorecording sheet according to claim 1, wherein the reducing agent is a sulfide.

7. A process for producing an electrorecording sheet according to claim 1, wherein the reducing agent is selected from aldehydes, formic acid and oxalic acid.

8. A process for producing an electrorecording sheet according to claim 1, wherein the heat sensitive materials are combination of a leuco body of triphenylmethane or fluoran dyes and an organic acid or a phenolic substance.

9. A process for producing an electrorecording sheet according to claim 1, wherein the heat sensitive materials are combination of an organic spot reagent and an organic metal salt reagent, said organic spot reagent being a material capable of reacting with a metal ion to form color or change its color and at least one of the reagent having a melting point of 70° – 150° C.

10. A process for producing an electrorecording sheet according to claim 1, wherein the heat sensitive materials are a leuco body of a redox indicator.

11. A process for producing an electrorecording sheet according to claim 1, wherein cuprous iodide and the reducing agent are dispersed in a binder, the suspension is coated on a support to form an electroconductive layer and a suspension of the heat sensitive materials is coated on said electroconductive layer to form a color forming layer.

12. A process for producing an electrorecording sheet according to claim 1, wherein a suspension of cuprous iodide, the reducing agent and the heat sensitive materials in a binder is coated on a support.

13. A process for producing an electrorecording sheet according to claim 1, wherein the support is selected from paper, plastic film, cloth, glass, carbon impregnated paper, metal deposited paper and carbon coated paper.

14. A process for producing an electrorecording sheet according to claim 11, wherein cuprous iodide is contained in the color forming layer.

15. A process for producing an electrorecording sheet according to claim 14, wherein the reducing agent is additionally contained in the color forming layer.

16. An electrorecording sheet prepared by the process of claim 1.

17. An electrorecording sheet prepared by the process of claim 5.

* * * * *